(12) United States Patent
Lin et al.

(10) Patent No.: US 7,702,883 B2
(45) Date of Patent: Apr. 20, 2010

(54) VARIABLE-WIDTH MEMORY

(75) Inventors: Jian Lin, San Jose, CA (US); Anthony L. Chun, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 11/122,071

(22) Filed: May 5, 2005

(65) Prior Publication Data
US 2006/0253640 A1 Nov. 9, 2006

(51) Int. Cl.
*G06F 12/00* (2006.01)

(52) U.S. Cl. .................. 711/220; 711/5; 711/E12.002; 711/E12.005

(58) Field of Classification Search ........................ None
See application file for complete search history.

(56) References Cited

U.S. PATENT DOCUMENTS

| | | | | |
|---|---|---|---|---|
| 3,701,111 A | * | 10/1972 | Cocke et al. | 341/67 |
| 3,717,851 A | * | 2/1973 | Cocke et al. | 711/220 |
| 4,319,324 A | * | 3/1982 | Johnson et al. | 711/5 |
| 5,021,977 A | * | 6/1991 | Sakaguchi | 345/559 |
| 5,345,560 A | * | 9/1994 | Miura et al. | 711/3 |
| 5,675,826 A | * | 10/1997 | Manze et al. | 345/574 |
| 2002/0038415 A1 | * | 3/2002 | Zandveld et al. | 712/206 |

OTHER PUBLICATIONS

Anonymous. Audio and Video Streaming. Cornell University [online], Dec. 2, 2002 [retrieved on Apr. 27, 2007]. Retrieved from the Internet <URL: http://www.cit.cornell.edu/atc/itsupport/streaming.shtml>.*

* cited by examiner

*Primary Examiner*—Reginald G Bragdon
*Assistant Examiner*—Larry T MacKall
(74) *Attorney, Agent, or Firm*—Blakely, Sokoloff, Taylor & Zafman LLP

(57) ABSTRACT

A variable-width memory may comprise multiple memory banks from which data may be selectively read in such a way that overall memory access requirements may be reduced, which may result in associated reduction in power consumption.

14 Claims, 3 Drawing Sheets

VARIABLE-WIDTH MEMORY

BACKGROUND OF THE INVENTION

Reconfigurable computation devices may be used to perform many different functions. Given a variety of possible functions, there may be different control and/or memory requirements for different functions. In particular, a reconfigurable computational device may be capable of implementing various functions that require different parameters and operations. Such a reconfigurable computational device may be configured, for example, by means of control words that may be provided by, for example, a control unit processor or a state machine. As a result of the different parameters and/or operations, these functions may, for example, require different-length control words.

Furthermore, the amount of power used to access memory is proportional to the memory word length. That is, a longer word requires more power to access than a shorter word. Consequently, if one function does not require a word length as long as that of another function, power may be wasted in accessing an entire word having a length required to accommodate all functions.

BRIEF DESCRIPTION OF THE DRAWINGS

Various embodiments of the invention will now be described in connection with associated drawings, in which.

DETAILED DESCRIPTION OF EMBODIMENTS OF THE INVENTION

In the following description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
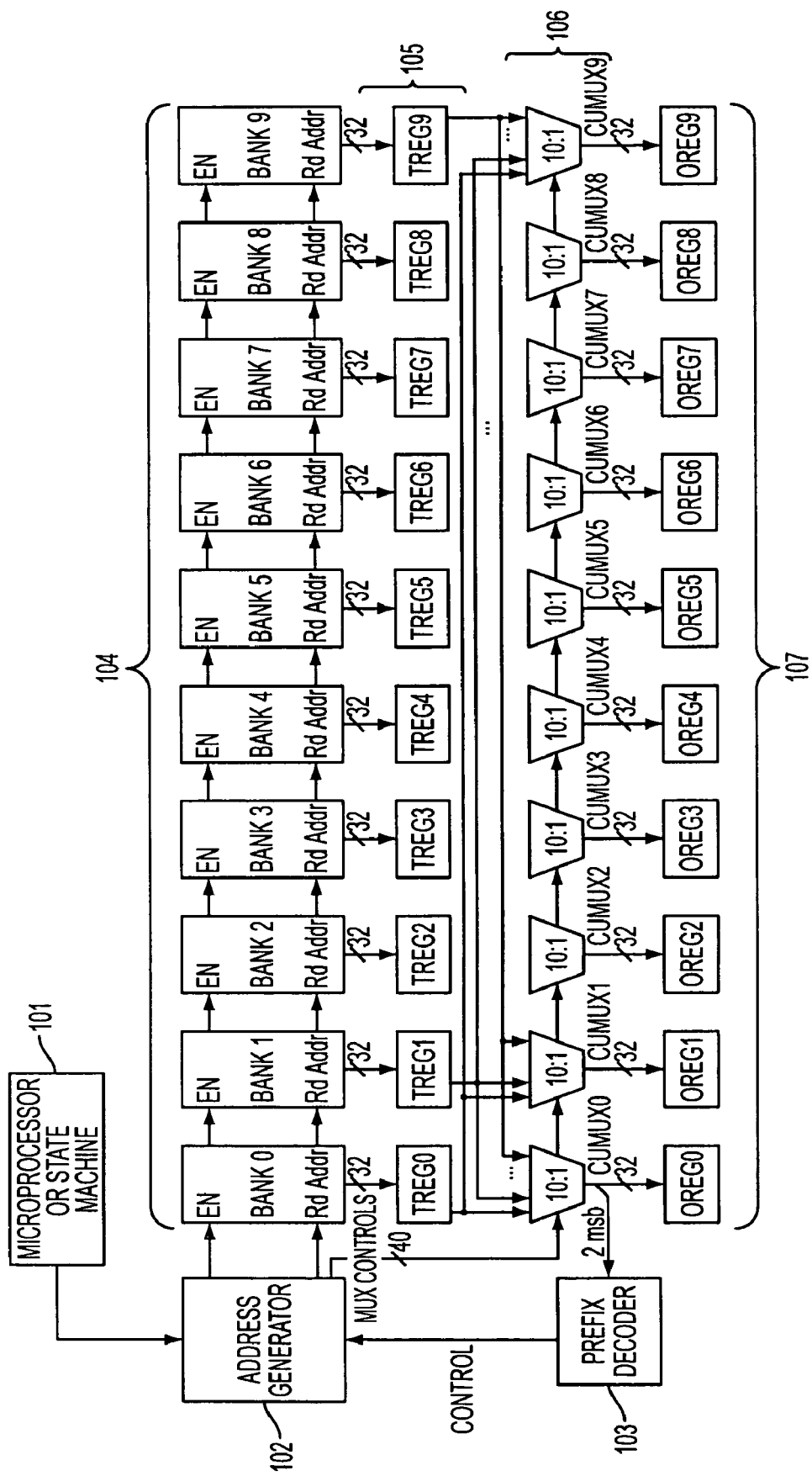
FIG. 1 depicts a schematic diagram of an apparatus and system according to an embodiment of the present invention.

FIG. 1 shows a schematic block diagram of an apparatus and system according to an exemplary embodiment of the invention. In a typical system, the inventive apparatus may be coupled to a microprocessor, state machine, or other logic (which may be external to the apparatus) 101 that may be used to generate an address vector. The apparatus itself may include an address generator 102 that may be coupled to the microprocessor, state machine, or other logic 101 to receive the address vector and to generate control signals for the apparatus.

The apparatus may further comprise a plurality (say, M) of parallel memory banks 104. The memory banks 104 may be of a uniform word length C bits. In this case, it may be possible to generate an entry (which may be, for example, a control word) having a length M×C bits by considering the outputs of all of the memory banks 104. Therefore, in a general system, M and C may be chosen such that M×C bits corresponds to the largest entry length that may be needed.

The apparatus may also include a prefix decoder 103. According to various embodiments of the invention, an initial portion of an entry stored in memory banks 104 may include an n-bit prefix. The prefix length n may be chosen so that $2^n$ is greater than or equal to the number of different desired entry lengths that one may wish to use. Prefix decoder 103 may then use the prefix to determine how many of the memory banks 104 may be accessed to obtain a particular desired entry length.

The apparatus may further include a plurality of temporary registers 105, a plurality of multiplexers (MUXes) 106, and/or a plurality of output registers 107. The number of each of these pluralities may be equal to the number of memory banks 104, M. In such an embodiment, words may be read out of the memory banks 104 into the temporary registers 105. The temporary registers 105 may be coupled to the MUXes 106, and the MUX outputs may be coupled to the output registers 107.

In various embodiments of the invention, the apparatus may function as follows. The address generator 102 may provide enable signals and/or actual addresses used to access memory banks 104. The address and enable signals may be dependent upon control information provided to address generator 102 by prefix decoder 103.

Figure 2:
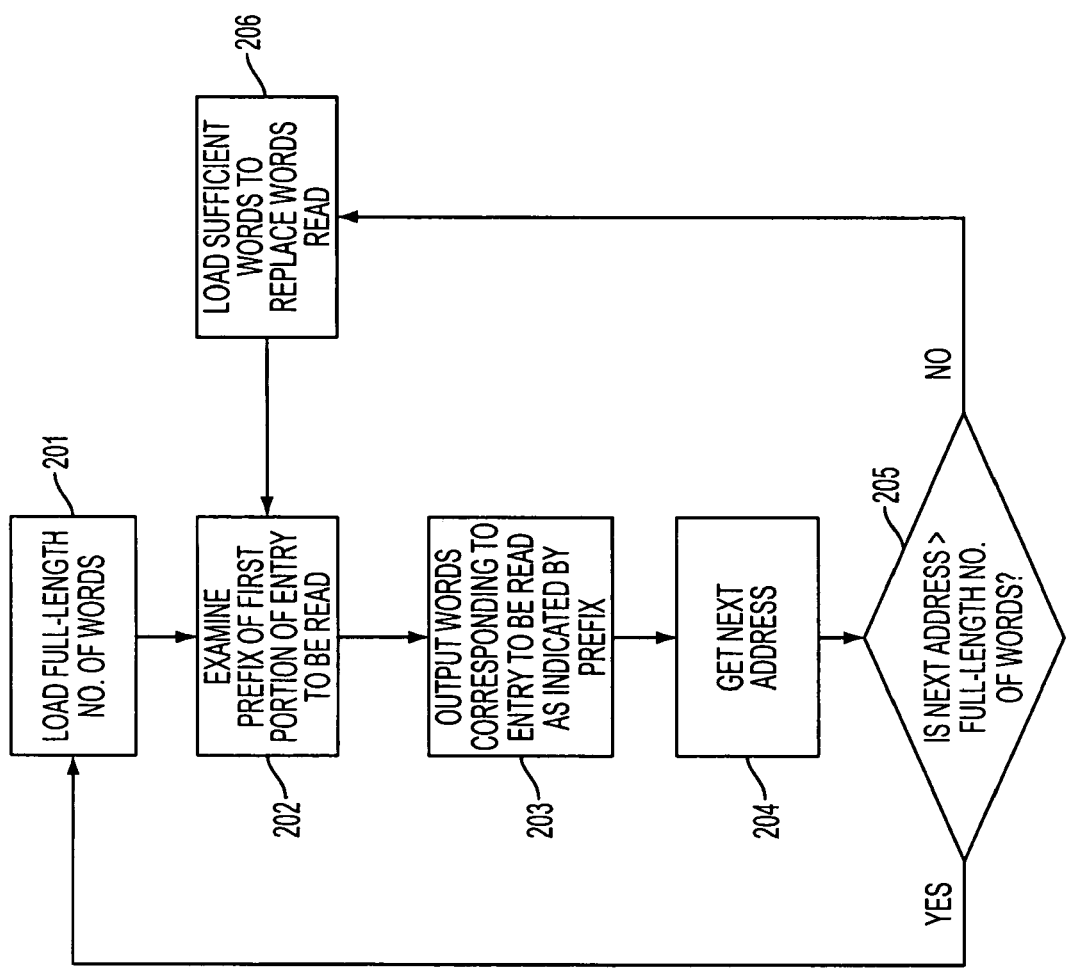
FIG. 2 depicts a flowchart illustrating an exemplary embodiment of a method according to an embodiment of the invention.

FIG. 2 depicts a flowchart showing the further functioning of the apparatus, according to various embodiments of the invention. Initially, a full-length number of words, comprising a uniform-length (C-bit) word from each memory bank 104, may be loaded 201 into temporary registers 105. A prefix of a first word of an entry to be read out, which may be included in the full-length number of words, may then be examined 202 by prefix decoder 103. As discussed above, the prefix may be used to indicate the length of the entry. In an illustrative example, to which the invention is not limited and to which FIG. 3 may also refer, C may be 32 bits, M may be ten (memory banks 104), and a two-bit prefix may be used to indicate whether an entry to be read may have 32 bits, 64 bits, or 320 bits.

The prefix decoder 103 may output control information to address generator 102, where the control information may be used to indicate the size of the entry to be read out. Address generator 102 may then use this control information to generate MUX control signals to indicate which data may be passed from temporary registers 105 through which MUXes 106 to output registers 107, in order to output the appropriate portion of the full-length number of words that corresponds to the entry to be read out 203. The MUXes 106 may be M:1 MUXes (i.e., M inputs and one output), and the MUX width may be C bits. Each MUX 106 may be coupled to each of the temporary registers 105 and may allow any of the temporary register 105 contents to be output to an output register 107. In the illustrative example shown in FIG. 1, each of the ten MUXes 106 may use four control bits to select one of ten inputs, and the address generator 102 may thus output 10×4, or forty, control bits for the ten MUXes 106.

Once the appropriate amount of data has been read into output registers 107, a next address, if any, may be acquired 204 (e.g., from microprocessor, state machine, or other logic 101). The next address may designate a location from which next data may be read. Address generator 102 may determine 205 if the next address is more than a full-length number, M, of C-bit words away from the previously-read data. If so, then a new full-length number of words may be loaded 201, and the process may be repeated, as shown in FIG. 2. Otherwise, only a number of words sufficient to replace the words that were read out may be loaded 206, and the process may similarly repeat.

To illustrate the latter operations, it may be useful to again consider the illustrative example of M=10 and C=32 with two-bit prefixes. An initial prefix may indicate that the entry to be read out currently has a length of 64 bits (two 32-bit words). The next address may indicate that the next data to be read out may be included within the same 320 bits as the entry that was just output. Therefore, it may not be necessary to read an entire new 320 bits out of memory banks 104 to obtain the next data to be output. On the other hand, if the next address indicates that the next word to be output may begin beyond the current 320 bits, it may be necessary to read a new 320 bits (ten words) from memory banks 104.

Figure 3:
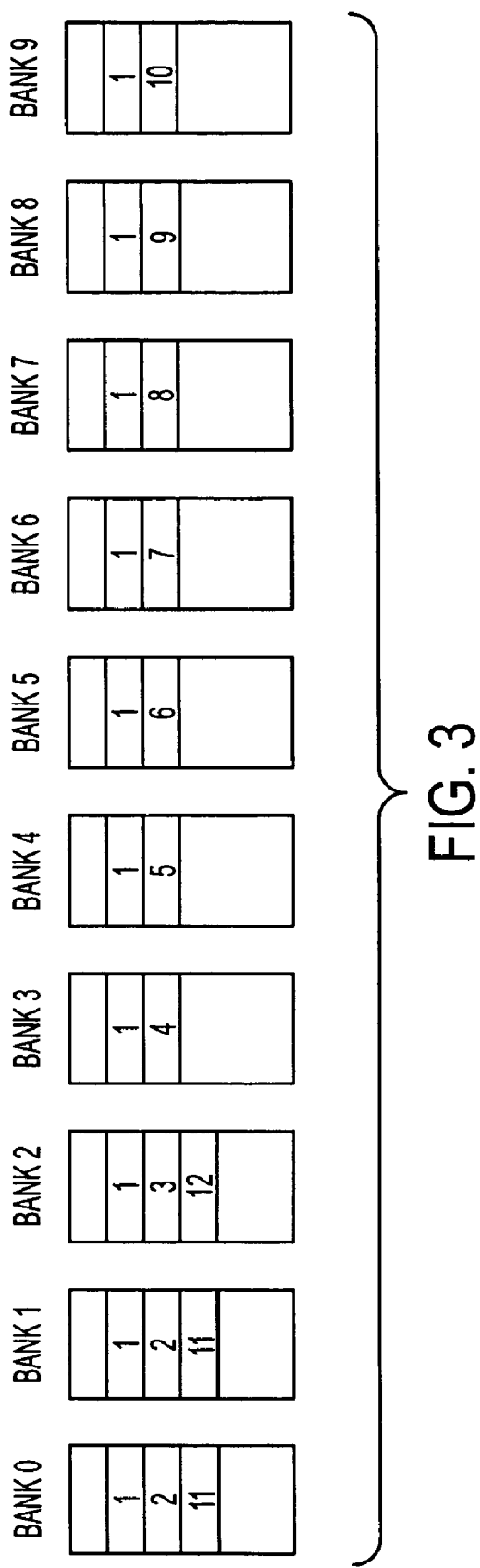
FIG. 3 depicts an illustrative example showing operation according to an exemplary embodiment of the invention.

FIG. 3 may be used to understand this in further detail. FIG. 3 shows an illustrative example of what may be stored in ten memory banks 104, referred to here as Bank 0 to Bank 9. The numbers shown inside Banks 0-9 may refer to entry numbers, where the entries refer here to data to be read out together as a block. These may be read out as follows, in a particular example to which the invention is not limited.

Entry 1 may, as shown, consist of ten 32-bit words (one in each memory bank 104). The words labeled "1" may, upon receipt of control information by address generator 102 and subsequent output of control signals, be read into temporary registers 105, and the prefix of the word "1" that was stored in Bank 0, which is the first word in Entry 1, may be passed through a first MUX 106 such that its prefix may be fed to prefix decoder 103. The prefix in this case may indicate that Entry 1 may have 320 bits (ten words), which may then be read from output registers 107.

Upon receipt of control information by address generator 102, the next ten words, which may be contained in Banks 0-9, may be read into temporary registers 105 (following read-out of a full-length (in this example, ten-word) entry, a new full set of ten words may need to be obtained from memory banks 104). Entry 2 may consist of two words, as shown, stored in Banks 0 and 1. The prefix of the first word of Entry 2, which may be routed through the first MUX 106 to prefix decoder 103, may indicate that Entry 2 has 64 bits (two words). This prefix information may then be used to read the two words from two of the output registers 107.

In the example of FIG. 3, the next control information received may address Entry 3. The address of Entry 3 is less than a full 320 bits from the address of Entry 2, so only a partial-length entry, in this case Entry 11, which may consist of two words (64 bits), may be read into temporary registers 105. Similarly to the previous cases, the one word of Entry 3 may be routed through the first MUX 106 so that its prefix, which may indicate that Entry 3 consists of one word (32 bits), may be read by prefix decoder 103. Entry 3 may then be read out of an output register 107.

Subsequently, Entry 12 may replace Entry 3 in the temporary registers 105 (under the assumption that Entry 4 may be read next, whose address may be less than 320 bits away from the address of Entry 3). The process may continue in a similar fashion.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. An apparatus, comprising:
   a plurality of parallel memory units adapted to i) store a full-length number of words and ii) output in parallel an entry, wherein said entry comprises a variable length number of words including a first word including a fixed-length prefix portion comprising entry length information of said entry;
   an address generator to receive an address of said entry to be read from said plurality of memory units, said address generator coupled to said plurality of memory units to control said plurality of parallel memory units based on the address of said entry to be read and control information, the control information comprising said entry length information;
   a prefix processor to examine said prefix portion of said first word of said entry stored in said memory units to generate said control information based on said prefix portion, said prefix processor coupled to said address generator to provide said address generator with said control information; and
   a plurality of output registers coupled to said plurality of memory units to receive a number of words of data read from said memory units equal to said entry length information.

2. The apparatus according to claim 1, further comprising:
   a plurality of multiplexers coupled to said plurality of memory units to receive data read from said plurality of memory units, said multiplexers coupled to said address generator to receive multiplexer control information, the multiplexer control information based on the control information from said prefix processor, to indicate data to be output.

3. The apparatus according to claim 2, further comprising:
   a plurality of output registers coupled to said plurality of multiplexers to receive data read from at least one of said memory units according to said control information to indicate data to be output.

4. The apparatus according to claim 2, further comprising:
   a plurality of registers coupled to said plurality of memory units and to said plurality of multiplexers to store data read from said memory units and to provide said data to said multiplexers.

5. The apparatus according to claim 2, wherein said plurality of multiplexers output data based on said fixed-length prefix portion of said entry.

6. The apparatus according to claim 1, wherein said plurality of output registers comprise parallel registers adapted to receive, in parallel, a parallel output comprising said entry from said parallel memory units based on said fixed-length prefix portion of the entry.

7. The apparatus according to claim 1, wherein said plurality of parallel memory units output based on said fixed-length prefix portion of said entry.

8. The apparatus according to claim 1, wherein said address generator generates output based on said control information generated by said prefix processor.

9. A system, comprising:

a plurality of parallel memory units adapted to i) store a full-length number of words and ii) output in parallel an entry, wherein said entry comprises a variable length number of words including a first word including a fixed-length prefix portion comprising entry length information of said entry;

an address generator to receive an address of said entry to be read from said plurality of memory units, said address generator coupled to said plurality of memory units to control said plurality of parallel memory units based on the address of said entry to be read and control information, the control information comprising said entry length information;

a prefix processor to examine said prefix portion of said first word of said entry stored in said memory units to generate said control information based on said prefix portion, said prefix processor coupled to said address generator to provide said address generator with said control information; and an address source coupled to said address generator to provide said address of said entry to be read, said address source comprising at least one of the group consisting of a microprocessor, a state machine, and external logic; and a plurality of output registers coupled to said plurality of memory units to receive a number of words of data read from said memory units equal to said entry length information.

10. The system according to claim 9, further comprising:

a plurality of multiplexers coupled to said plurality of memory units to receive data read from said plurality of memory units, said multiplexers coupled to said address generator to receive multiplexer control information, the multiplexer control information based on the control information from said prefix processor, to indicate data to be output.

11. The system according to claim 10, further comprising:

a plurality of registers coupled to said plurality of memory units and to said plurality of multiplexers to store data read from said memory units and to provide said data to said multiplexers.

12. A method comprising:

loading a full-length number of words comprising words stored in a plurality of parallel memory units adapted to i) store a full-length number of words and ii) output in parallel an entry, wherein an entry comprises a variable length number of words including a first word including a fixed-length prefix portion comprising entry length information of said entry;

controlling the plurality of parallel memory units with an address generator based on control information, the control information comprising said entry length information;

examining said prefix of said first word of said entry using a prefix processor coupled to the address generator to generate the control information based on said prefix portion; and outputting a number of words based on the control information.

13. The method according to claim 12, further comprising:

obtaining an address of a next entry to be output; and determining if the address of said next entry is greater than a length of said full-length number of words away from said first word of said entry.

14. The method according to claim 13, further comprising:

loading a partial-length number of words, comprising one or more words stored in said memory units and fewer than said full-length number of words, if the address of said next entry is not greater than the length of said full-length number of words away from said first word of said entry; and loading a new full-length number of words if the address of said next entry is greater than the length of said full-length number of words away from said first word of said entry.

* * * * *